(12) United States Patent
Jeong et al.

(10) Patent No.: US 10,517,013 B2
(45) Date of Patent: Dec. 24, 2019

(54) METHOD AND APPARATUS FOR GENERATING CONNECTION IN WIRELESS COMMUNICATION SYSTEM

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/125,452

(22) PCT Filed: Mar. 11, 2015

(86) PCT No.: PCT/KR2015/002349
§ 371 (c)(1),
(2) Date: Sep. 12, 2016

(87) PCT Pub. No.: WO2015/137721
PCT Pub. Date: Sep. 17, 2015

(65) Prior Publication Data
US 2017/0078911 A1    Mar. 16, 2017

(30) Foreign Application Priority Data

Mar. 13, 2014    (KR) .................. 10-2014-0029875

(51) Int. Cl.
*H04W 28/02*        (2009.01)
*H04W 76/10*        (2018.01)
(Continued)

(52) U.S. Cl.
CPC ..... *H04W 28/0268* (2013.01); *H04L 12/1407* (2013.01); *H04M 15/66* (2013.01);
(Continued)

(58) Field of Classification Search
CPC ...................................................... H04W 8/02
See application file for complete search history.

(56) References Cited

U.S. PATENT DOCUMENTS

2009/0305684 A1*  12/2009  Jones ................. H04L 63/20
                                                         455/418
2011/0075675 A1*  3/2011   Koodli ............... H04L 12/14
                                                         370/401
(Continued)

FOREIGN PATENT DOCUMENTS

CN        103444148 A       12/2013
KR    10-2012-0120308 A     11/2012
(Continued)

OTHER PUBLICATIONS

NEC, 'Fix FFS in the solution B', C4-131941, 3GPP TSG-CT WG4 #63, San Francisco, US.
(Continued)

*Primary Examiner* — Alpus Hsu
*Assistant Examiner* — Camquyen Thai
(74) *Attorney, Agent, or Firm* — Jefferson IP Law, LLP

(57) ABSTRACT

A method for transmitting and receiving a signal in a packet data network gateway (PGW) of a mobile communication system according to an embodiment of the present specification comprises the steps of: receiving a first request message which includes an identifier of a terminal and is associated with a packet data network connection; sending a second request message to a policy and charging rules function (PCRF) server on the basis of the received first request message; and if quality of service (QoS) related information is included in a response message received in response to the second request message from the PCRF, performing a control associated with the packet data network connection on the basis of the QoS related information. In a wireless communication system using a PMIP according (Continued)

to the present invention, it is possible to generate a PDN connection in accordance with the default QoS.

8 Claims, 14 Drawing Sheets

(51) Int. Cl.
| | |
|---|---|
| *H04W 76/12* | (2018.01) |
| *H04W 76/11* | (2018.01) |
| *H04W 8/02* | (2009.01) |
| *H04W 88/16* | (2009.01) |
| *H04L 12/14* | (2006.01) |
| *H04W 4/24* | (2018.01) |
| *H04M 15/00* | (2006.01) |

(52) U.S. Cl.
CPC .............. *H04W 4/24* (2013.01); *H04W 8/02* (2013.01); *H04W 76/10* (2018.02); *H04W 76/11* (2018.02); *H04W 76/12* (2018.02); *H04W 88/16* (2013.01)

(56) References Cited

U.S. PATENT DOCUMENTS

| | | | |
|---|---|---|---|
| 2011/0202485 A1 | 8/2011 | Cutler et al. | |
| 2012/0124229 A1* | 5/2012 | Sahu | H04W 76/10 709/228 |
| 2012/0182859 A1* | 7/2012 | Ikeda | H04L 1/1835 370/216 |
| 2012/0246325 A1* | 9/2012 | Pancorbo Marcos | H04L 63/102 709/227 |
| 2013/0310030 A1* | 11/2013 | Ventimiglia | H04W 48/16 455/434 |
| 2013/0322347 A1* | 12/2013 | Alex | H04W 74/00 370/329 |
| 2013/0322365 A1* | 12/2013 | Garcia Martin | H04W 72/048 370/329 |
| 2014/0044098 A1 | 2/2014 | Roeland et al. | |
| 2014/0146746 A1* | 5/2014 | Forsman | H04W 88/18 370/328 |
| 2014/0245403 A1* | 8/2014 | Li | H04L 12/66 726/4 |
| 2015/0092688 A1 | 4/2015 | Jeong et al. | |

FOREIGN PATENT DOCUMENTS

| | | |
|---|---|---|
| KR | 10-2013-0001439 A | 1/2013 |
| KR | 10-2013-0103446 A | 9/2013 |
| KR | 10-2014-0016713 A | 2/2014 |

OTHER PUBLICATIONS

Chinese Office Action dated Mar. 29, 2019, issued in Chinese Application No. 201580013630.5.

* cited by examiner

METHOD AND APPARATUS FOR GENERATING CONNECTION IN WIRELESS COMMUNICATION SYSTEM

TECHNICAL FIELD

An embodiment of the present disclosure relates to a method and apparatus for a terminal to generate a connection with a core network in a wireless communication system, and more particularly, to a method and apparatus for generating a connection for a terminal which accesses a 3GPP (3rd Generation Partnership Project) network through a non-3GPP network.

BACKGROUND ART

Typically the wireless communication system was developed for providing a voice service while guaranteeing user's activity. The wireless communication system is then expanding gradually its service region to a data service as well as the voice service and is now developed to the extent capable of offering a high-speed data service. The currently available wireless communication system, however, confronts a shortage of resources and users' demands for much higher-speed service, so that a more advanced wireless communication system is needed.

As one of next generation wireless communication systems developed to meet these needs, LTE (Long Term Evolution) was standardized in the 3GPP. LTE is technology for realizing high-speed packet based communication having the maximum transfer rate of about 100 Mbps. For this, some schemes are under discussion, for example, a scheme of reducing the number of nodes deployed on a communication channel by simplifying the architecture of a network, a scheme of maximally rendering a wireless protocol close to a wireless channel, and the like.

In order to increase the degree of freedom in the configuration of an operator's network, the LTE system supports interworking with an access network of non-3GPP, which is not standardized in the 3GPP, as well as E-UTRAN which uses the LTE transfer technology for a RAN (Radio Access Network) which interworks with a core network. Although various ways of interworking between a non-3GPP access network and an LTE core network can be used, an ePDG (Evolved Packet Data Gateway) is normally used for interworking between the non-3GPP access network and the LTE core network.

DISCLOSURE OF INVENTION

Technical Problem

In case of using a protocol such as a PMIP (Proxy Mobile IP) for supporting the mobility of user equipment, it is not possible to deliver default QoS information about user equipment to the core network in the LTE network. Therefore, since an LTE core network node may not generate a PDN connection based on the default QoS information, a method and apparatus for solving this is required.

Solution to Problem

In order to solve the above technical problem, a signal transmission and reception method in a packet data network gateway (PGW) of a mobile communication system according to an embodiment of this disclosure includes steps of receiving a first request message containing an identifier of user equipment and being associated with a packet data network connection; transmitting a second request message to a policy and charging rules function (PCRF) server, based on the received first request message; and if quality of service (QoS) related information is contained in a response message received from the PCRF in response to the second request message, performing a control associated with the packet data network connection, based on the QoS related information.

A signal transmission and reception method in a policy and charging rules function (PCRF) server of a mobile communication system according to another embodiment of this disclosure includes steps of receiving a request message associated with a packet data network connection from a packet data network gateway (PGW); and if quality of service (QoS) related information associated with the packet data network connection is not contained in the request message, transmitting a response message containing QoS information associated with the packet data network connection to the PGW in response to the request message.

A packet data network gateway (PGW) of a mobile communication system according to another embodiment of this disclosure includes a transceiver unit that transmits and receives a signal; and a control unit that controls the transceiver unit to receive a first request message containing an identifier of user equipment and being associated with a packet data network connection, controls the transceiver unit to transmit a second request message to a policy and charging rules function (PCRF) server, based on the received first request message, and if quality of service (QoS) related information is contained in a response message received from the PCRF in response to the second request message, performs a control associated with the packet data network connection, based on the QoS related information.

A policy and charging rules function (PCRF) server of a mobile communication system according to another embodiment of this disclosure includes a transceiver unit that transmits and receives a signal; and a control unit that controls the transceiver unit to receive a request message associated with a packet data network connection from a packet data network gateway (PGW), and if quality of service (QoS) related information associated with the packet data network connection is not contained in the request message, controls the transceiver unit to transmit a response message containing QoS information associated with the packet data network connection to the PGW i n response to the request message.

Advantageous Effects of Invention

According to the present invention, in the wireless communication system using PMIP, it is possible to generate a PDN connection based on the default QoS. Specifically, according to an embodiment of the present disclosure, when user equipment using a non-3GPP network accesses the 3GPP network, it is possible to generate a PDN connection based on QoS by generating a connection for the user equipment and then delivering QoS information associated with the connection.

MODE FOR THE INVENTION

Figure 1:
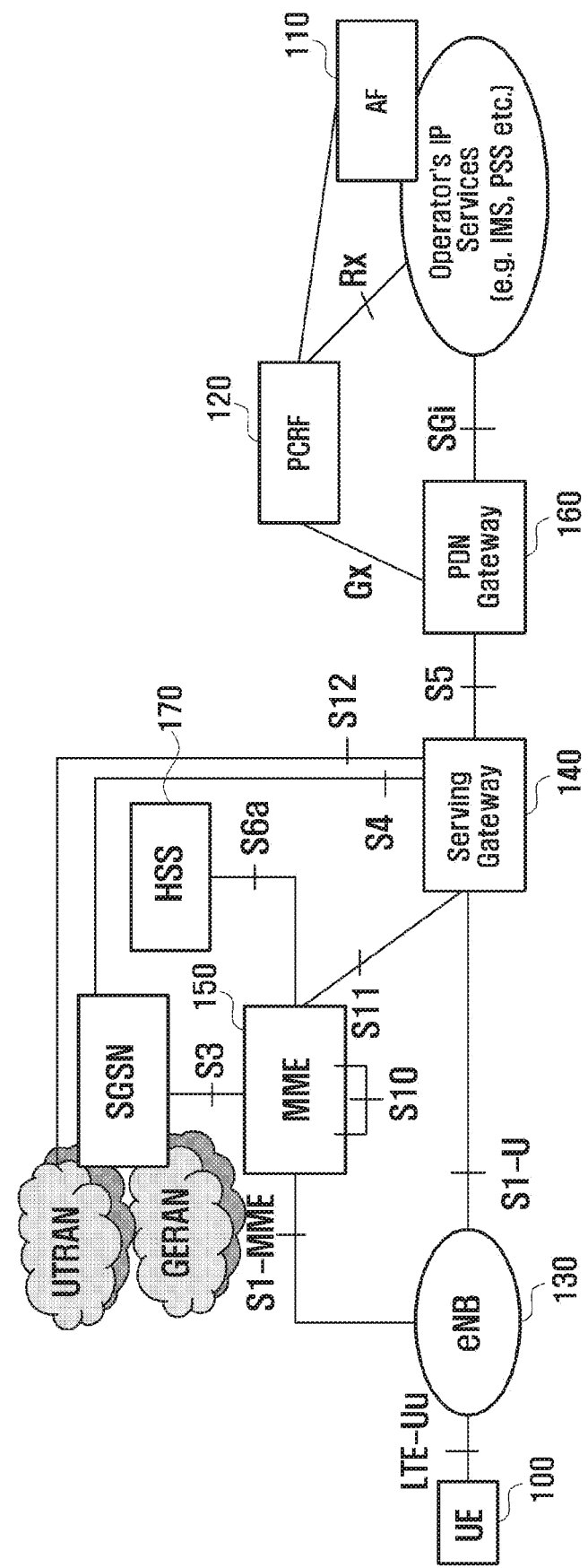
FIG. 1 is a diagram illustrating a structure of a communication system according to an embodiment of the present disclosure.

Hereinafter, embodiments of the present invention will be described with reference to the accompanying drawings.

In the following, technical contents well known in the art and having no direct relation to this invention may not be described or illustrated in detail to avoid obscuring the subject matter of the present invention.

Similarly, through the drawings, some elements may be exaggerated, omitted or schematically depicted. The same or similar reference numerals denote corresponding features consistently.

Advantages and features of this invention and methods for achieving them will become clear with reference to the following embodiments together with drawings. The present invention is, however, not limited to the embodiments set forth herein and may be embodied in many different forms. Rather, the disclosed embodiments are provided so that this disclosure will be thorough and complete, and will fully convey the scope of this invention to those skilled in the art as defined by the appended claims.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as FPGA or ASIC, which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Additionally, well known functions and configurations may not be described or illustrated in detail to avoid obscuring the subject matter of the present invention.

Although embodiments of the present invention will be described hereinafter by mainly targeting a basic 3GPP LTE system, the essential concept of this invention may be favorably applied to any other communication/computer system having a similar technical background and system configuration without departing from the scope of this invention as will be apparent to those skilled in the art.

For example, the disclosed technique for the LTE system may be also applied to the UTRAN/GERAN system having a similar system structure. In this case, an ENB (RAN node) may be replaced by RNC/BSC, an S-GW may be omitted or included in SGSN, and a P-GW may correspond to GGSN. Also, the concept of bearer in the LTE system may correspond to PDP context in the UTRAN/GERAN system.

FIG. 1 is a diagram illustrating a structure of a communication system according to an embodiment of the present disclosure. Depending on an embodiment, the communication system may be a mobile communication system based on LTE.

Referring to FIG. 1, as shown, a wireless access network of the LTE mobile communication system may be formed of an evolved Node B (EUTRAN, hereinafter referred to as ENB or Node B) 130, an MME (Mobility Management Entity) 150, and an S-GW (Serving-Gateway) 140.

User equipment (hereinafter referred to as UE) 100 may access an external network through the ENB 130, the S-GW 140, and a P-GW (PDN-Gateway) 160. In order to allow the UE to transmit or receive data through the P-GW, a PDN connection should be generated and one PDN connection may include one or more EPS bearers.

An AF (Application Function) 110 is an apparatus that exchanges application-related information with a user at the level of application.

A PCRF 120 is an apparatus that controls a user's policy associated with QoS (Quality of Service). A PCC (Policy and Charging Control) rule corresponding to the above policy is delivered and applied to the P-GW 160.

The ENB 130 is an RAN (Radio Access Network) node and corresponds to RNC of a UTRAN system and to BSC of a GERAN system. The ENB 130 is connected to the UE 100 in a radio channel and performs a role similar to that of the existing RNC/BSC.

Since all user traffics including real-time services such as a VoIP (Voice over IP) are offered through a shared channel in LTE, an apparatus for collecting status information of the UEs 100 and performing scheduling is needed. The ENB 130 is in charge of this.

The S-GW 140 is an apparatus that offers a data bearer, and creates or removes the data bearer under the control of the MME 150.

The MME 150 is an apparatus that performs various control functions, and a single MME 150 may be connected with a plurality of ENBs.

The PCRF 120 is an entity that generally controls QoS and charging with regard to traffic.

Meanwhile, as mentioned above, the LTE system supports interworking with any access network other than 3GPP as well as E-UTRAN. If any non-3GPP access network is interworked, the non-3GPP access network may be connected to the PGW 160 directly or through an additional ePDG. For processing subscriber information or authentication with regard to the non-3GPP access network, an HSS (Home Subscriber Server) 170 and an AAA (Authentication, Authorization and Accounting) server may exchange information with each other and may also be realized as a signal entity. The term ePDG is exemplarily used for convenience. Even in case the non-3GPP access network is connected to the PGW directly or connected through any node, e.g., the S-GW, other than ePDG, an embodiment disclosed herein may be applied without any considerable modification.

Figure 2:
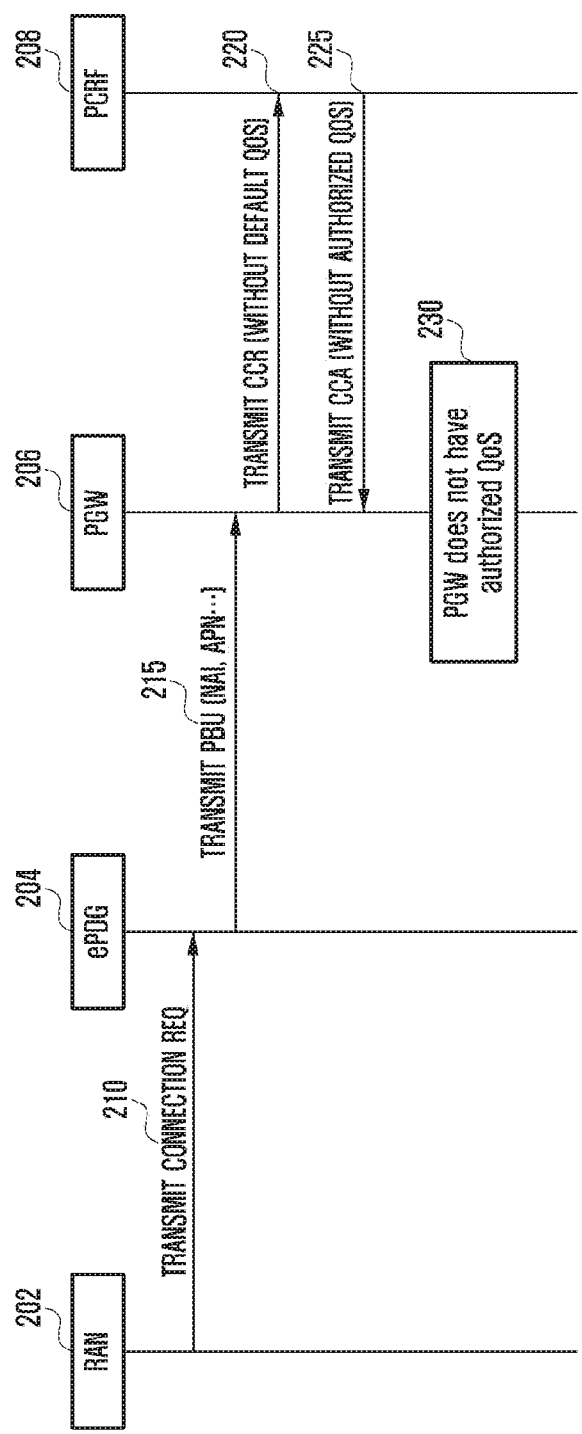
FIG. 2 is a diagram illustrating a connection establishment method according to an embodiment of the present disclosure.

FIG. 2 is a diagram illustrating a connection establishment method according to an embodiment of the present disclosure.

Referring FIG. 2, this connection establishment method is offered for an RAN 202 that accesses a core network through an ePDG 204.

This embodiment may indicate a procedure of exchanging signals between the RAN 202, the ePDG 204, a PGW 206, and a PCRF 208, and a procedure of requiring UE to register at an EPC (Evolved Packet Core) through a non-3GPP network including the RAN 202 or to generate a PDN connection.

In this embodiment, the RAN may include 1×ENB using CDMA or an AP (Access Point) using a wireless LAN.

At step 210, the RAN 202 may deliver a request transmitted by UE to the ePDG 204. Specifically, this request of the UE may be delivered to the ePDG through the non-3GPP RAN.

At step 215, the ePDG may transmit a PBU (Proxy Binding Update) message to the PGW. In an embodiment, the PBU message may contain at least one of ID (NAI (Network Access Identifier)) of the UE and an APN (Access Point Name) through which the UE will receive a service. At this time, the PGW 206 fails to receive a default EPS bearer QoS information (hereinafter referred to as default QoS) about the UE through the PBU message received from the ePDG 204. Therefore, the PGW 206 has no QoS parameter to be used when the requested PDN connection is generated.

At step 220, the PGW 206 may transmit a CCR (Credit Control Request) message to the PCRF 208. Specifically, when transmitting a request message (e.g., the CCR message) to the PCRF 208, the PGW 206 transmits the message without inserting a QoS parameter.

At step 225, the PCRF 208 may transmit a CCA (Credit Control Answer) message to the PGW 206. At this time, because of failing to receive the QoS request from the PGW 206, the PCRF 208 may not insert QoS information authorized by the PCRF 208 when sending a response message (e.g., the CCA message).

Therefore, at step 230, the PGW 206 may have a problem that there is no QoS information to be applied to the generation of a PDN connection.

In order to solve this problem, one embodiment of the present disclosure proposes that the non-3GPP RAN receives subscription information about UE from the AAA server and then delivers the default QoS information, among the subscription information, to the PGW through the ePDG. The ePDG may use the PBU message so as to deliver the default QoS, received from the non-3GPP RAN, to the PGW.

Figure 3:
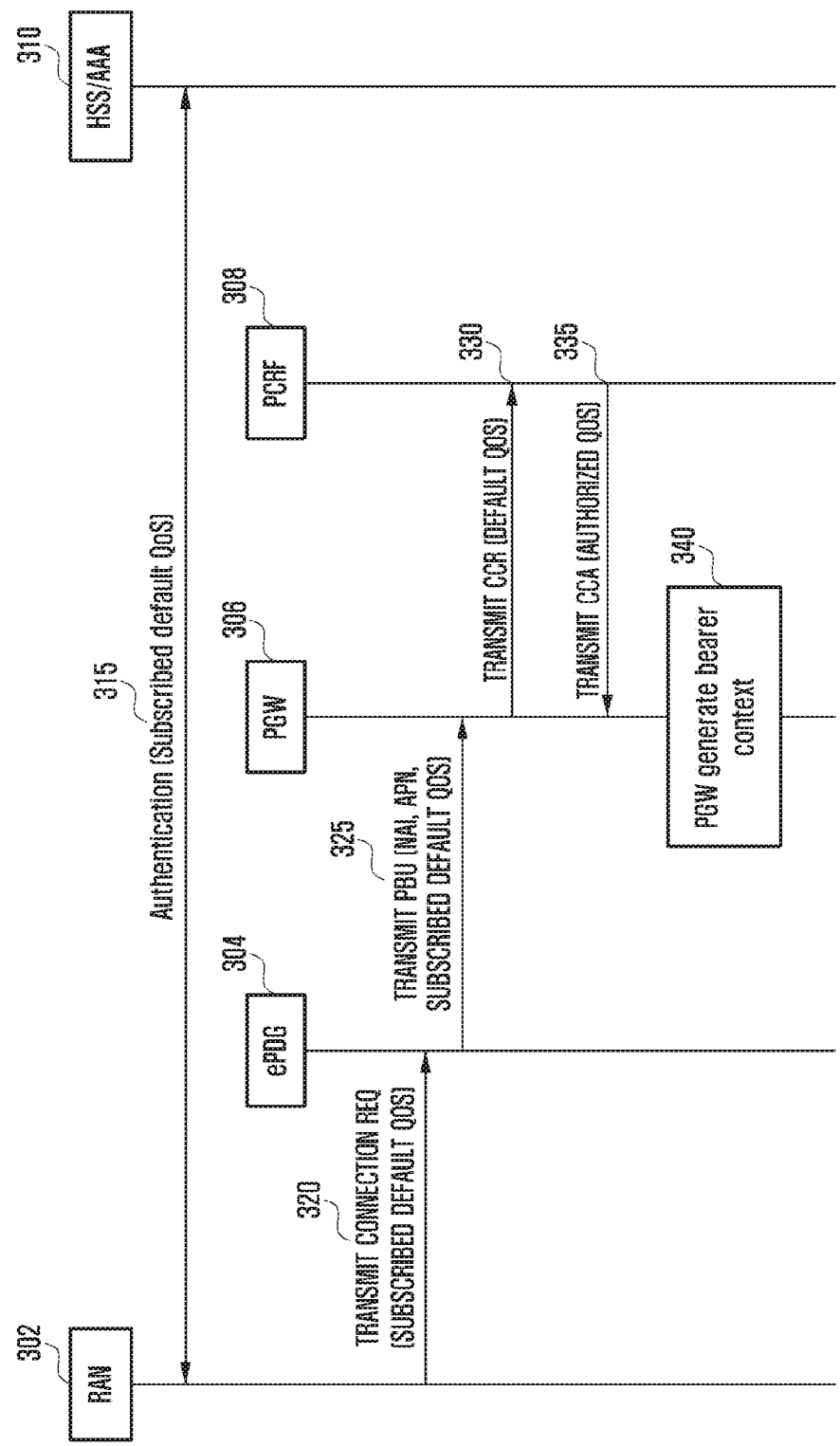
FIG. 3 is a diagram illustrating a connection establishment method according to an embodiment of the present disclosure.

FIG. 3 is a diagram illustrating a connection establishment method according to an embodiment of the present disclosure.

Referring to FIG. 3, this embodiment may indicate a procedure of exchanging signals between a RAN 302, an ePDG 304, a PGW 306, a PCRF 308, and a HSS/AAA 310.

In this embodiment, when UE accesses the EPC via the non-3GPP network, the UE may undergo an authentication procedure.

At step 315, authentication information about the UE is delivered from the HSS/AAA 310 to the non-3GPP access network (the RAN 302 in this embodiment). Depending on an embodiment, in this process, the HSS/AAA 310 may deliver default QoS information about the UE to the non-3GPP access network. In an embodiment, the received default QoS information about the UE may be determined on the basis of subscription information.

At step 320, the non-3GPP access network 302 that receives the authentication information containing the default QoS information about the UE may deliver a message requested by the UE to the ePDG 304 with the received default QoS information.

At step 325, the ePDG 304 may send a PBU (Proxy Binding Update) message to the PGW 306. In an embodiment, the PBU message may contain at least one of the default QoS of the UE received from the non-3GPP access network, an ID (NAI (Network Access Identifier)) of the UE, and an APN (Access Point Name) through which the UE will receive a service.

In this case, since the PGW 306 receives the default EPS bearer QoS information about the UE through the PBU message received from the ePDG 304, the PGW 306 may generate a default EPS bearer about the UE by using the received information.

In an embodiment, if a dynamic PCC (Policy and Charging Control) through the PCRF 308 is used, the PGW 306 may transmit a request message (e.g., CCR (Credit Control Request)) to the PCRF 308 at step 330 with the previously received QoS parameter.

At step 335, the PCRF 308 that receives the QoS request from the PGW 308 may transmit, to the PGW 306, a response message (e.g., CCA (Credit Control Answer)) that contains QoS information authorized by the PCRF 308.

Therefore, at step 340, the PGW 306 may use the QoS information authorized by the PCRF 308 so as to generate a PDN connection or an EPS bearer. Namely, the PGW 306 generates an EPS bearer context by using the QoS information (default bearer QoS including APN-AMBR and QCI) contained in the response message (CCA) received from the PCRF 308. Even though any QoS information is further received from other network entity (e.g., the HSS/AAA 310) in a subsequent procedure, the PGW 306 still uses the QoS information received from the PCRF 308 without using the further received QoS information. Specifically, the PGW 306 uses the default QoS information received from the HSS/AAA 310 when failing to receive such information from the PCRF 308.

Figure 4:
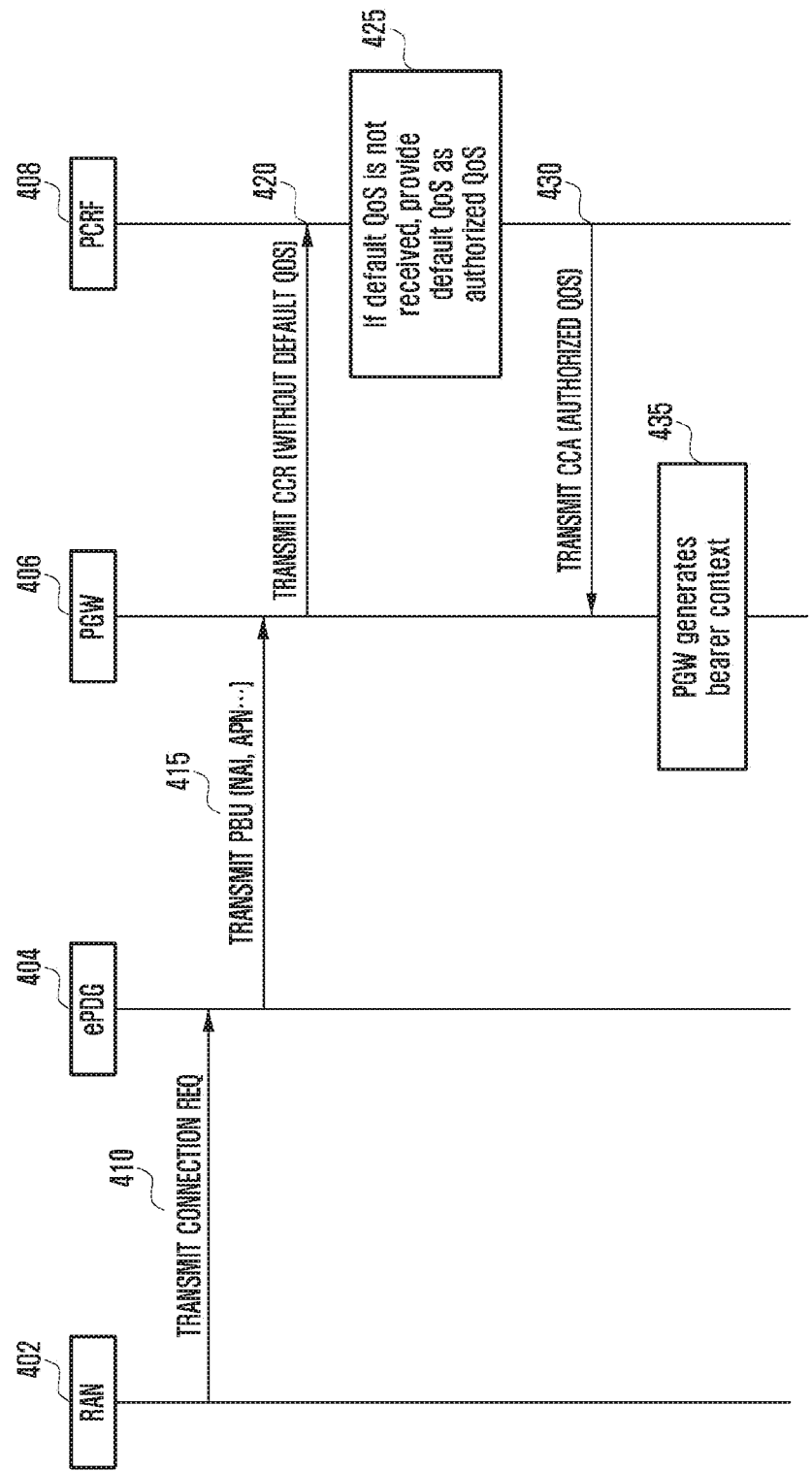
FIG. 4 is a diagram illustrating a connection establishment method according to another embodiment of the present disclosure.

FIG. 4 is a diagram illustrating a connection establishment method according to another embodiment of the present disclosure.

Referring to FIG. 4, signals may be transmitted or received between a RAN 402, an ePDG 404, a PGW 406, and the PCRF 408.

Specifically, this embodiment proposes a method in which, if the PGW 407 fails to deliver the default EPS bearer QoS to the PCRF 408, the PCRF 408 delivers the default EPS bearer QoS, stored therein, as the authorized QoS for UE to the PGW 408.

In case of having to register at the EPC through the non-3GPP network or generate a PDN connection in response to a request of the UE, this request may be delivered to the ePDG 404 through the non-3 GPP RAN 402 at step 410.

At step 415, the ePDG 404 may send a PBU (Proxy Binding Update) message to the PGW 406. In an embodiment, the PBU message may contain at least one of ID (NAI (Network Access Identifier)) of the UE and an APN (Access Point Name) through which the UE will receive a service.

In this case, since the PGW 406 fails to receive the default EPS bearer QoS information about the UE through the PBU message received from the ePDG 404, the PGW 406 has no QoS parameter to be used when the requested PDN connection is generated.

Therefore, at step 420, the PGW 406 may transmit a request message (e.g., CCR (Credit Control Request)) containing no QoS parameter to the PCRF 408. In an embodiment, this request message may contain ID of the UE.

At step 425, if the message received from the PGW 406 contains no default EPS bearer QoS, the PCRF 408 may provide the default bearer QoS information, stored therein, as authorized QoS information.

At step 430, the PCRF 408 may transmit a response message (e.g., CCC (Credit Control Answer)) containing the default bearer QoS information to the PGW 406.

Specifically, the PCRF 408 may transmit, to the PGW 406, the response message having the default bearer QoS information stored therein as authorized QoS information.

Therefore, at step 435, the PGW 406 may use the QoS information offered by the PCRF 408 so as to generate a PDN connection or an EPS bearer.

Namely, the PGW 406 generates an EPS bearer context by using the QoS information (default bearer QoS including APN-AMBR and QCI) contained in the response message (CCA) received from the PCRF 408. Even though any QoS information is further received from other network entity (e.g., the HSS/AAA) in a subsequent procedure, the PGW 406 still uses the QoS information received from the PCRF 408 without using the further received QoS information. Specifically, the PGW 406 uses the default QoS information received from the HSS/AAA when failing to receive such information from the PCRF 408.

Figure 5:
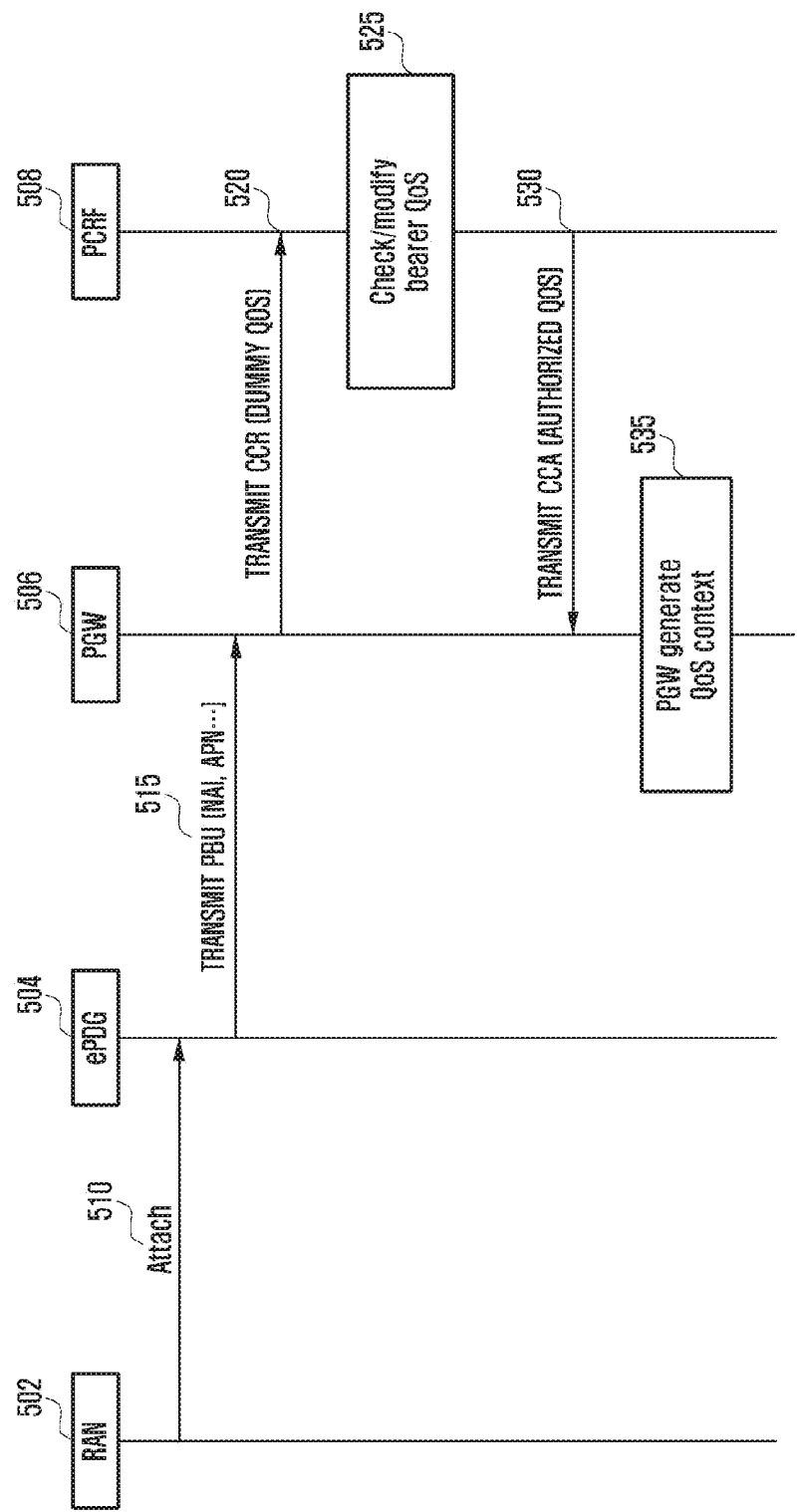
FIG. 5 is a diagram illustrating a connection establishment method according to another embodiment of the present disclosure.

FIG. 5 is a diagram illustrating a connection establishment method according to another embodiment of the present disclosure.

Referring to FIG. 5, signals may be transmitted or received between a RAN 502, an ePDG 504, a PGW 506, and the PCRF 508.

Specifically, in this embodiment, if the PGW 506 fails to receive any default EPS bearer QoS, the PGW 506 generate an arbitrary bearer QoS and delivers it to the PCRF 508. This allows the PGW 506 to receive available QoS information from the PCRF 508 in case the PCRF 508 is set to provide an authorized EPS bearer QoS only when the default EPS bearer QoS is received from the PGW 506.

In case of having to register at the EPC through the non-3GPP network or generate a PDN connection in response to a request of UE, this request may be delivered to the ePDG 504 through the non-3 GPP RAN 502 at step 510.

At step 515, the ePDG 504 may transmit a PBU (Proxy Binding Update) message to the PGW 506. In an embodiment, the PBU message may contain at least one of ID (NAI (Network Access Identifier)) of the UE and an APN (Access Point Name) through which the UE will receive a service.

In this case, since the PGW 506 fails to receive the default EPS bearer QoS information about the UE through the PBU message received from the ePDG 504, the PGW 506 has no QoS parameter to be used when the requested PDN connection is generated.

At step 520, the PGW 506 may transmit, to the PCRF 508, a message containing arbitrary EPS bearer QoS information created thereby. Specifically, in an embodiment, if a network is implemented such that the PCRF 508 returns authorized QoS information to the PGW 506 only when the PGW 506 requests the PCRF 508 to authorize the EPS bearer QoS (namely, in case the PGW delivers the default EPS bearer QoS to the PCRF), the PGW 506 may insert predetermined EPS bearer QoS information or arbitrarily generated EPS bearer QoS information in a message to be sent to the PCRF 508 so as to receive QoS information from the PCRF 508. Since this is not the EPS bearer QoS contained in subscription information about UE, this may be regarded as a dummy EPS bearer QoS. Namely, the PGW 506 may transmit, to the PCRF 508, a request message (e.g., CCR (Credit Control Request)) containing the dummy EPS bearer QoS. Also, in an embodiment, this request message may contain ID of the UE.

At step 525, the PCRF 508 may check the received EPS bearer QoS information and, if necessary, selectively modify the received EPS bearer QoS information. In an embodiment, the modified EPS bearer QoS information may be QoS information authorized by the PCRF 508.

At step 530, the PCRF 508 may transmit, to the PGW 506, a response message containing the authorized QoS information. Specifically, since the message received from the PGW 506 contains the default EPS bearer QoS (namely, the dummy EPS bearer QoS in this case), the PCRF 508 may transmit, to the PGW 506, the response message (e.g., CCA (Credit Control Answer)) containing the QoS information authorized by the PCRF 508.

Therefore, at step 535, the PGW 506 may use the QoS information offered by the PCRF 508 so as to generate a PDN connection or an EPS bearer.

Namely, the PGW 506 generates an EPS bearer context by using the QoS information (default bearer QoS including APN-AMBR and QCI) contained in the response message (CCA) received from the PCRF 508. Even though any QoS information is further received from other network entity (e.g., the HSS/AAA) in a subsequent procedure, the PGW 506 still uses the QoS information received from the PCRF 508 without using the further received QoS information. Specifically, the PGW 506 uses the default QoS information received from the HSS/AAA when failing to receive such information from the PCRF 508.

Figure 6:
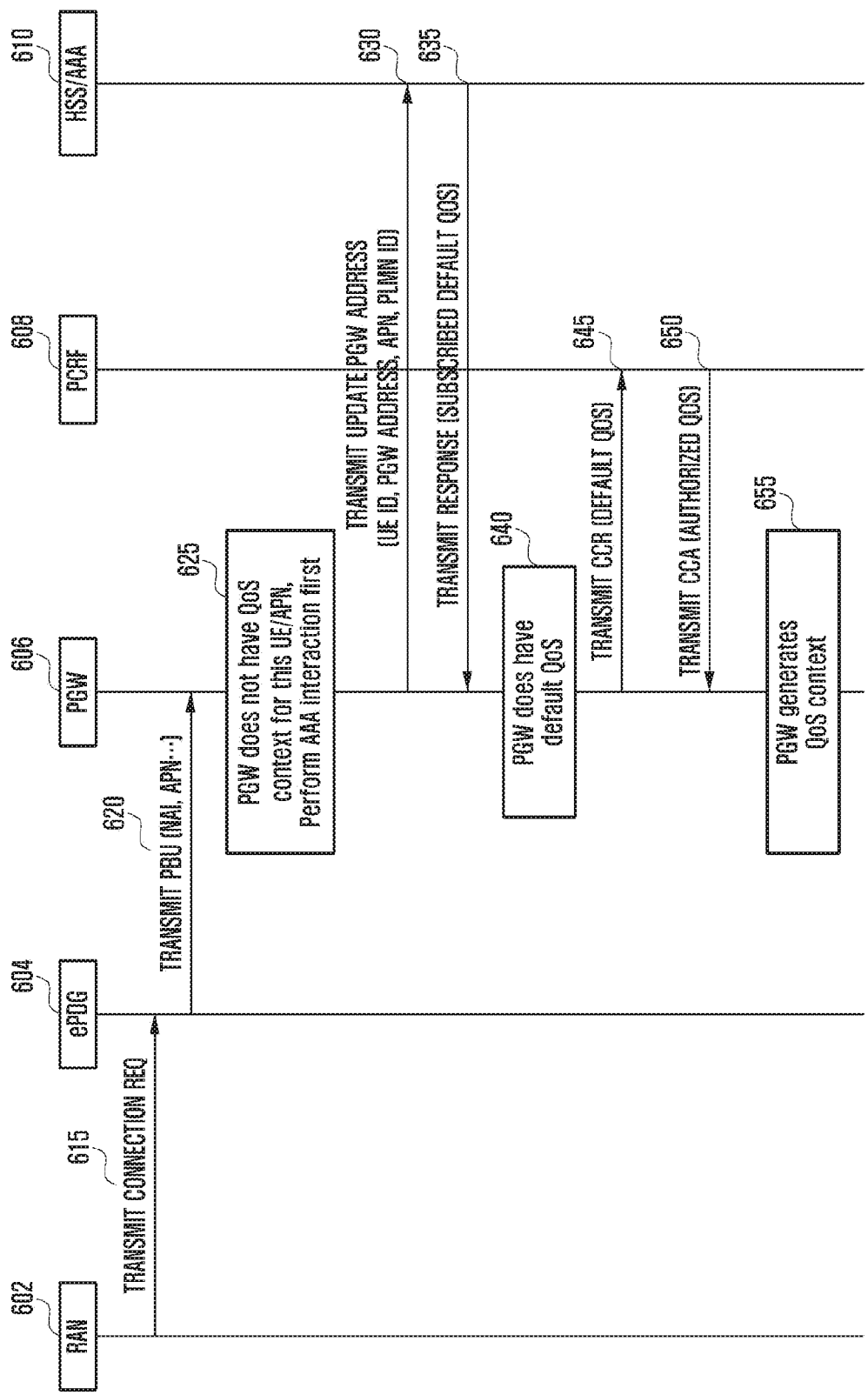
FIG. 6 is a diagram illustrating a connection establishment method according to another embodiment of the present disclosure.

FIG. 6 is a diagram illustrating a connection establishment method according to another embodiment of the present disclosure.

Referring to FIG. 6, signals may be transmitted or received between a RAN 602, an ePDG 604, a PGW 606, a PCRF 608, and a HSS/AAA 610.

Specifically, this embodiment proposes a method in which, if any default EPS bearer is not contained in the PUB message received from the ePDG 604, the PGW 606 exchanges a message with the AAA/HSS 610 before a message exchange with the PCRF 606 and thereby receives the default EPS bearer information through the AAA/HSS 610. Namely, by receiving the default EPS bearer through the AAA/HSS 610 and then delivering it to the PCRF 608, the PGW 606 may receive an authorized EPS bearer QoS from the PCRF 608.

In case of having to register at the EPC through the non-3GPP network or generate a PDN connection in response to a request of UE, this request may be delivered to the ePDG 604 through the non-3 GPP RAN 502 at step 615.

At step 620, the ePDG 604 may transmit a PBU (Proxy Binding Update) message to the PGW 606. In an embodiment, the PBU message may contain at least one of ID (NAI (Network Access Identifier)) of the UE and an APN (Access Point Name) through which the UE will receive a service.

In this case, since the PGW 606 fails to receive the default EPS bearer QoS information about the UE through the PBU message received from the ePDG 604, the PGW 606 has no QoS parameter to be used when the requested PDN connection is generated.

If the PGW 606 has no default EPS bearer QoS about the UE, the PGW 606 may interwork with the HSS/AAA 610 at step 630 before interworking (i.e., a message exchange) with the PCRF 608.

For such interworking, the PGW 606 may transmit a message to the HSS/AAA 610. Specifically, in order to register an address of the PGW 606 for the UE in preparation for a handover between the non-3GPP network and the 3GPP network, the PGW 606 may perform an update PGW address procedure with the HSS/AAA 610. The update PGW address procedure is started by the PGW 606 sends an authorization request message to the HSS/AAA 610. This message may contain at least one of an identifier of UE, an address of PGW, an APN regarding UE, and a PLMN identifier registered for UE. Although the authorization request message is described as an example of a transmitting message in an embodiment, such information may be delivered through other message.

At step 635, the HSS/AAA 610 may transmit a response message, for example, an authorization answer message, to the PGW 606. This response message may contain the default EPS bearer QoS regarding UE. This default EPS bearer QoS may be included in the APN and PGW Data IE (Information Element). In an embodiment, in order to induce the HSS/AAA 610 to transmit the default EPS bearer QoS subscribed for the UE to the PGW 606, the request message, e.g., an authorization request message, transmitted to the HSS/AAA 610 by the PGW 606 in the update PGW address procedure may contain explicit information indicating a request for receiving the default EPS bearer QoS.

At step 640, the PGW 606 that receives the default EPS bearer QoS from the HSS/AAA 610 may generate a PDN connection (or an EPS bearer therefor) by using this.

At step 645, the PGW 606 may transmit a request message (e.g., CCR (Credit Control Request)) to the PCRF 608 by inserting the default EPS bearer QoS, based on information received from the HSS/AAA 610, in the request message. Also, in an embodiment, this request message may contain ID of the UE.

At step 650, since the default EPS bearer QoS is contained in the message received from the PGW 606, the PCRF 608 transmits, to the PGW 606, a response message (e.g., CCA (Credit Control Answer)) that contains QoS information authorized by the PCRF.

Therefore, at step 655, the PGW 606 may use the authorized default EPS bearer QoS information received from the PCRF 608 so as to generate a PDN connection or an EPS bearer.

Namely, the PGW 606 generates an EPS bearer context by using the QoS information (default bearer QoS including APN-AMBR and QCI) contained in the response message (CCA) received from the PCRF 608. Even though any QoS information is further received from other network entity (e.g., the HSS/AAA 610) in a subsequent procedure, the PGW 606 still uses information received from the PCRF 310 without using the further received QoS information. Specifically, the PGW 306 uses the default QoS information received from the HSS/AAA 310 only when failing to receive such information from the PCRF 308.

Meanwhile, if HSS and AAA are formed of separate entities in connection with the HSS/AAA 610 in the above-discussed embodiment, the HSS and the AAA may exchange subscription information (including default EPS bearer QoS) about UE with each other. For example, if subscription information about the UE is stored in the HSS, and if the PGW 606 is connected with the AAA, the AAA may deliver information to the HSS on the basis of a request received from the PGW 606 or deliver information received from the HSS to the PGW 606.

Meanwhile, in the above embodiment, after notifying the update PGW address through the step 630 and then receiving the default EPS bearer QoS through the step 635, the PGW 606 may fail to perform a requested operation (i.e., generate a PDN connection or generate a default EPS bearer) for a certain reason. A representative situation is case of failing to receive authorization even though delivering the default EPS bearer QoS, received from the HSS/AAA 610, to the PCRF 608, or case of a shortage of resources in the PGW 606. In this case, since an address of the PGW 606 stored in the HS S/AAA 610 through the step 630 is not available any more, the PGW 606 may perform again a procedure of notifying this, e.g., an update PGW address procedure, with the HSS/AAA 610. In this procedure, the PGW 606 may send, to the HSS/AAA 610, a session termination request with a diameter session ID determined through at least one of steps 630 and 635 and then receive a session termination answer as a response thereof.

Figure 7:
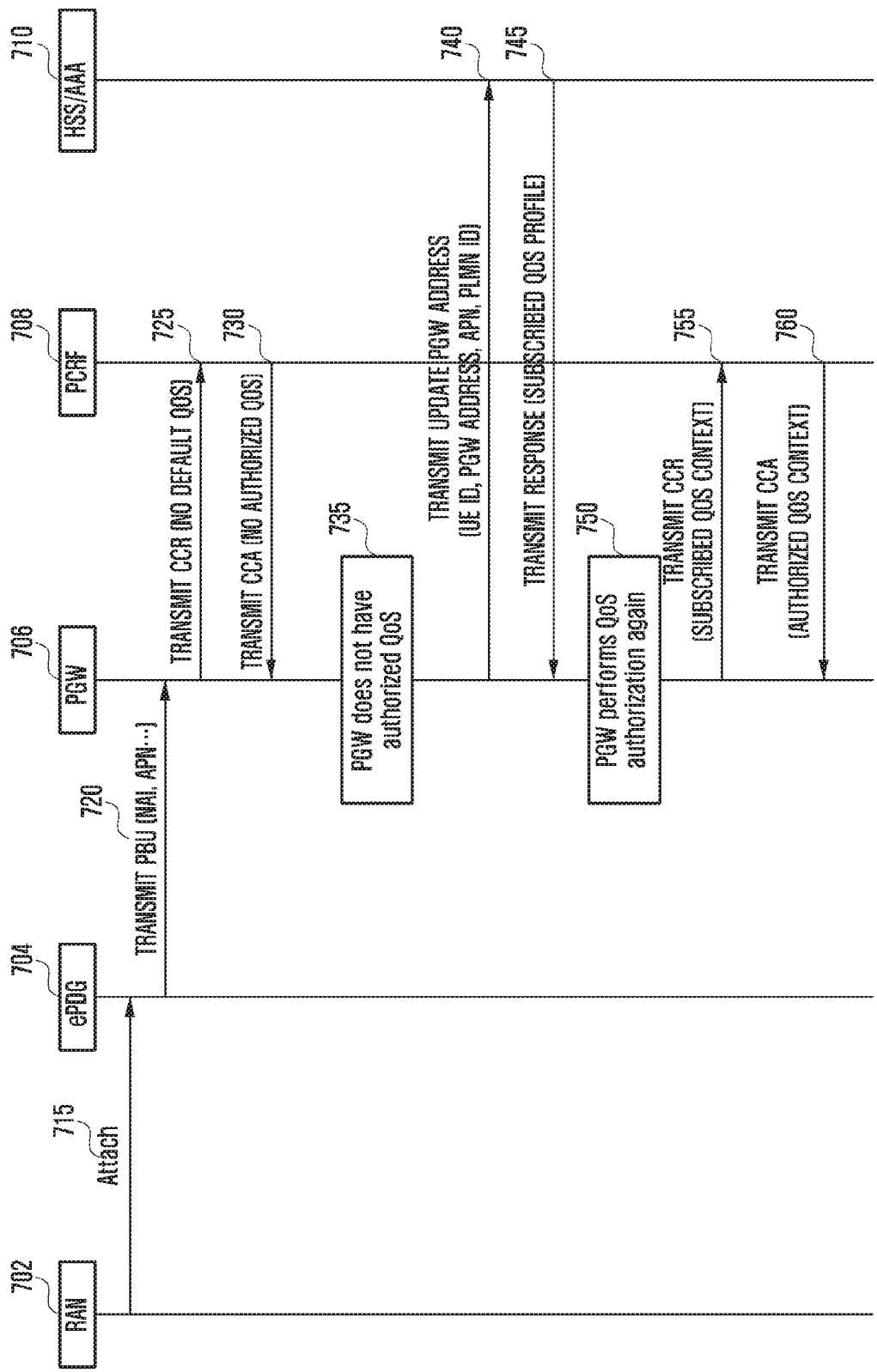
FIG. 7 is a diagram illustrating a connection establishment method according to another embodiment of the present disclosure.

FIG. 7 is a diagram illustrating a connection establishment method according to another embodiment of the present disclosure.

Referring to FIG. 7, signals may be transmitted and received between a RAN 702, an ePDG 704, a PGW 706, a PCRF 708, and a HSS/AAA 710.

Specifically, in this embodiment, the PGW 706 may perform additional operation for obtaining EPS bearer QoS information on the basis of at least one of information received from the ePDG 704 and information received from the PCRF 608. Specifically, when the default EPS bearer QoS is not inserted in a message transmitted to the PCRF 708, the PGW 706 does not know in advance whether the PCRF 708 is set to or not to insert QoS information in a response message. In case the PCRF 708 provides the authorized EPS bearer QoS to the PGW 706 (similar to the above embodiment of FIG. 6) even though the PGW 706 fails to deliver the default EPS bearer QoS to the PCRF 708, the PGW 706 may generate an EPS bearer context by using received information.

If the PGW 706 fails to deliver the default EPS bearer QoS to the PCRF 708, and also if the PCRF 708 fails to offer the authorized EPS bearer QoS to the PGW, the PGW 708 may use the subscribed default EPS bearer QoS received from the HSS/AAA 710 by performing an update PGW address procedure to the HSS/AAA 708, and may further obtain an authorized QoS by delivering this to the PCRF 708.

Specifically, in case of having to register at the EPC through the non-3GPP network or generate a PDN connection in response to a request of the UE, this request may be delivered to the ePDG 704 through the non-3 GPP RAN 702 at step 715.

At step 720, the ePDG 704 may send a PBU (Proxy Binding Update) message to the PGW 706. In an embodiment, the PBU message may contain at least one of ID (NAI (Network Access Identifier)) of the UE and an APN (Access Point Name) through which the UE will receive a service.

In this case, since the PGW 706 fails to receive the default EPS bearer QoS information about the UE through the PBU message received from the ePDG 704, the PGW 706 has no QoS parameter to be used when the requested PDN connection is generated.

At step 725, the PGW 706 may transmit a request message (e.g., CCR (Credit Control Request)) to the PCRF 708 without the default EPS bearer QoS.

At step 730, if the message received from the PGW 706 does not contain the default EPS bearer QoS, the PCRF 708 may transmit the response message (e.g., CCA (Credit Control Answer)) containing QoS information authorized by the PGW 708 as discussed in the above FIG. 4 embodiment. In this case, the PGW 706 may generate a PDN connection or an EPS bearer by using the received QoS information. In this FIG. 7 embodiment, the PCRF 708 may transmit the CCA message containing no QoS information to the PGW 706.

If the PCRF 708 fails to offer the QoS information, the PGW 706 may receive the default EPS bearer QoS while interworking with the HSS/AAA 710.

At step 740, in order to register a PGW address for the UE in preparation for a handover between the non-3GPP network and the 3GPP network, the PGW 706 may perform an update PGW address procedure with the HSS/AAA 710. The PGW 706 may transmit an authorization request message to the HSS/AAA 710 so as to start this procedure, and this message may contain at least one of an identifier of the UE, an address of the PGW, an APN regarding the UE, and a PLMN identifier registered for the UE.

At step 745, the HSS/AAA 710 receiving this sends, to the PGW 706, a response message, e.g., an authorization answer message, which contains the default EPS bearer QoS for the UE. The default EPS bearer QoS may be included in the APN and the PGW data IE (Information Element).

Like this, in order to induce the HS S/AAA 710 to transmit the default EPS bearer QoS subscribed for the UE to the PGW 706, the request message, e.g., an authorization request message, transmitted to the HSS/AAA 710 by the PGW 706 for initiating the update PGW address procedure may contain explicit information indicating a request for receiving the default EPS bearer QoS. Thereafter, at step 750, the PGW 706 that receives the default EPS bearer QoS from the HSS/AAA 710 may generate a PDN connection by using this.

In case the authorization for QoS of the PCRF 708 is needed, the PGW 706 may transmit, to the PCRF 708 at step 755, the request message (e.g., CCR (Credit Control Request)) containing the default EPS bearer QoS determined on the basis of information received from the HSS/AAA 710. Also, in an embodiment, the request message may contain an ID of the UE.

At step 760, since the default EPS bearer QoS is contained in the message received from the PGW 706, the PCRF 708 transmits, to the PGW 706, a response message (e.g., CCA (Credit Control Answer)) that contains QoS information authorized by the PCRF 708.

Therefore, at subsequent step, the PGW 706 may use the authorized default EPS bearer QoS information received from the PCRF 708 so as to generate a PDN connection or an EPS bearer.

Namely, the PGW 706 generates an EPS bearer context by using the QoS information (default bearer QoS including APN-AMBR and QCI) contained in the response message (CCA) received from the PCRF 708. Even though any QoS information is further received from other network entity (e.g., the HSS/AAA 710) in a subsequent procedure, the PGW 706 still uses information received from the PCRF 708 without using the further received QoS information. Specifically, the PGW 706 uses the default QoS information received from the HSS/AAA 710 only when failing to receive such information from the PCRF 706.

Meanwhile, in the above embodiment, after notifying the update PGW address through the step 740 and then receiving the default EPS bearer QoS through the step 745, the PGW 706 may fail to perform a requested operation (i.e., generate a PDN connection or generate a default EPS bearer) for a certain reason. A representative situation is case of failing to receive authorization even though delivering the default EPS bearer QoS, received from the HSS/AAA 710, to the PCRF 708, or case of a shortage of resources in the PGW 706. In this case, since an address of the PGW 706 stored in the HSS/AAA 710 through the step 740 is not available any more, the PGW 706 may perform again a procedure of notifying this, e.g., an update PGW address procedure, with the HSS/AAA 710. In this procedure, the PGW 706 may send, to the HSS/AAA 710, a session termination request with a diameter session ID determined through at least one of steps 730 and 735 and then receive a session termination answer as a response thereof.

Meanwhile, if HSS and AAA are formed of separate entities in connection with the HSS/AAA 610 in the above-discussed embodiment, the HSS and the AAA may exchange subscription information (including default EPS bearer QoS) about UE with each other. For example, if subscription information about the UE is stored in the HSS, and if the PGW 706 is connected with the AAA, the AAA may deliver information to the HSS on the basis of a request received from the PGW 706 or deliver information received from the HSS to the PGW 706.

Figure 8:
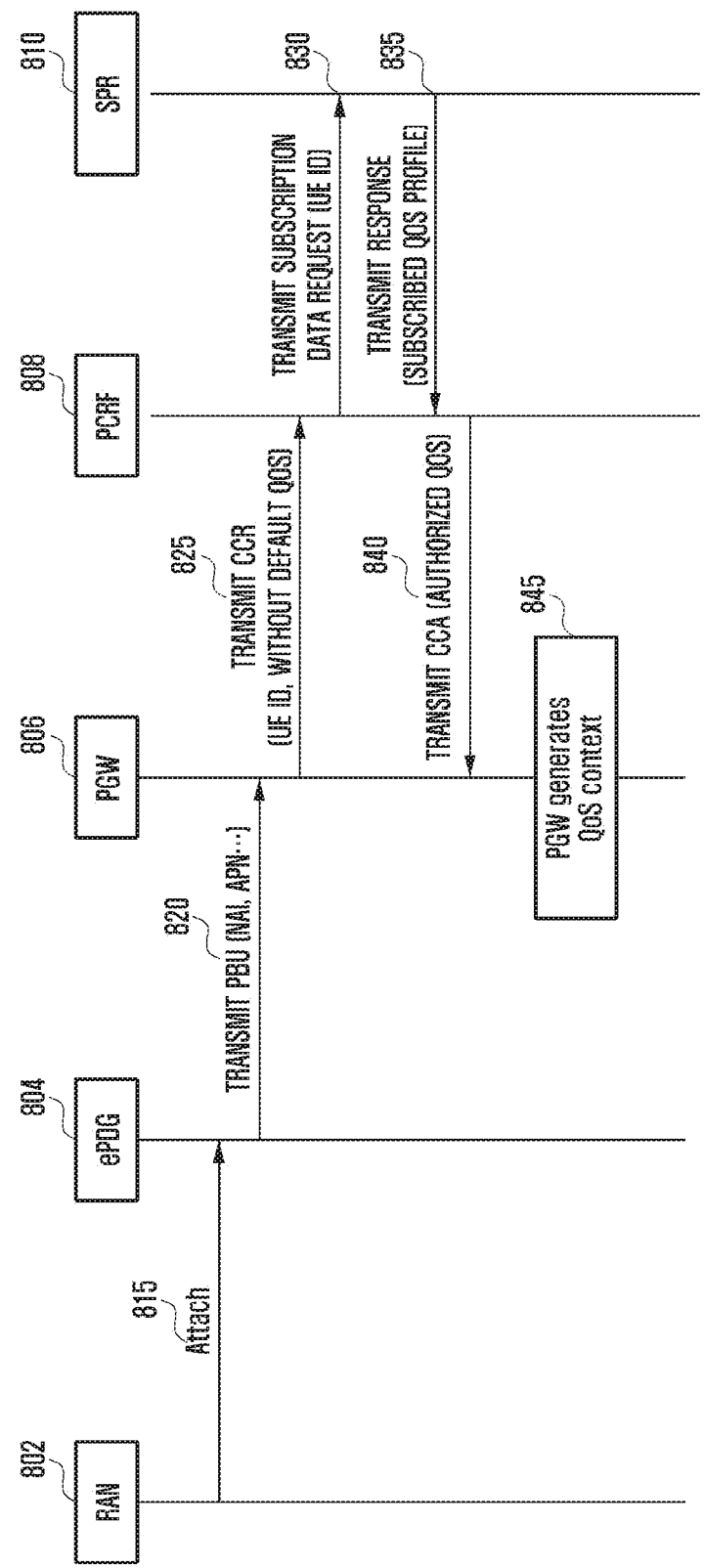
FIG. 8 is a diagram illustrating a connection establishment method according to another embodiment of the present disclosure.

FIG. 8 is a diagram illustrating a connection establishment method according to another embodiment of the present disclosure.

Referring to FIG. 8, signals may be transmitted and received between a RAN 802, an ePDG 804, a PGW 806, a PCRF 808, and a SPR (Subscription Profile Repository) 810.

Specifically, this embodiment proposes a method in which, if the PGW 806 fails to provide the default EPS bearer, the PCRF 808 provides the QoS information for generating the EPS bearer to the PGW 806 by using the default EPS bearer QoS among the subscription information received through the SPR 810.

In case of having to register at the EPC through the non-3GPP network or generate a PDN connection in response to a request of the UE, this request may be delivered to the ePDG 804 through the non-3 GPP RAN 802 at step 815.

At step 820, the ePDG 804 may send a PBU (Proxy Binding Update) message to the PGW 806. In an embodiment, the PBU message may contain at least one of ID (NAI (Network Access Identifier)) of the UE and an APN (Access Point Name) through which the UE will receive a service.

In this case, since the PGW 806 fails to receive the default EPS bearer QoS information about the UE through the PBU message received from the ePDG 804, the PGW 806 has no QoS parameter to be used when the requested PDN connection is generated.

At step 825, the PGW 806 may transmit a request message (e.g., CCR (Credit Control Request)) to the PCRF 808 without the default EPS bearer QoS. Also, in an embodiment, this request message may contain an ID of the UE.

At step 830, if the message received from the PGW 806 does not contain the default EPS bearer QoS, the PCRF 808 may request information associated with a subscribed default EPS bearer from the SPR.

At step 835, the PCRF 808 may receive the subscribed default EPS bearer from the SPR 810.

At step 840, the PCRF 808 may generate an authorized default EPS bearer QoS, based on the received subscribed default EPS bearer QoS information, and insert it in a response message (e.g., CCA (Credit Control Answer)) transmitted to the PGW 806.

At step 845, the PGW 806 may generate a PDN connection or an EPS bearer by using the received QoS information.

Namely, the PGW 806 generates an EPS bearer context by using the QoS information (default bearer QoS including APN-AMBR and QCI) contained in the response message (CCA) received from the PCRF 808. Even though any QoS information is further received from other network entity (e.g., the HSS/AAA) in a subsequent procedure, the PGW 806 still uses information received from the PCRF 808 without using the further received QoS information. Specifically, the PGW 806 uses the default QoS information received from the HSS/AAA only when failing to receive such information from the PCRF 808.

Meanwhile, although in this embodiment the PCRF 808 receives the subscription information for UE or the subscribed default EPS bearer QoS from the SPR 810 after receiving the message (e.g., CCR) from the PGW 806, the PCRF 808 may receive the subscription information for UE from the SPR 810 before receiving the message from the PGW 806.

In the above embodiments, the procedure of requesting a connection between the UE and the RAN (non-3GPP access network) or a message exchange between the RAN and the ePDG are described simply. These procedures may be performed through various methods and to be used together with techniques in this embodiment regardless of types of the connection method.

Meanwhile, it is possible to use a macro ENB and a small ENB together in order to divide the load of ENBs or increasing the capacity of the entire system. The macro ENB may be referred to as a primary ENB or a master ENB, and the small ENB may be referred to as a secondary ENB. Although the following embodiment is described for case of supporting simultaneously connections of the macro ENB and the small ENB, it is possible to use a plurality of macro ENBs together.

In case a dual connectivity function that supports simultaneously the connection of UE through the macro ENB and the small ENB, a control message for UE is controlled by the macro ENB, and the small ENB may be used for transmission of user traffic (user plane data).

If the macro ENB transfers one of the EPS bearers of the UE to the small ENB, or if a dual connectivity state modification such as revising or removing EPS bearer context of the small ENB is needed, it is required to exchange related information between respective network entities.

Figure 9:
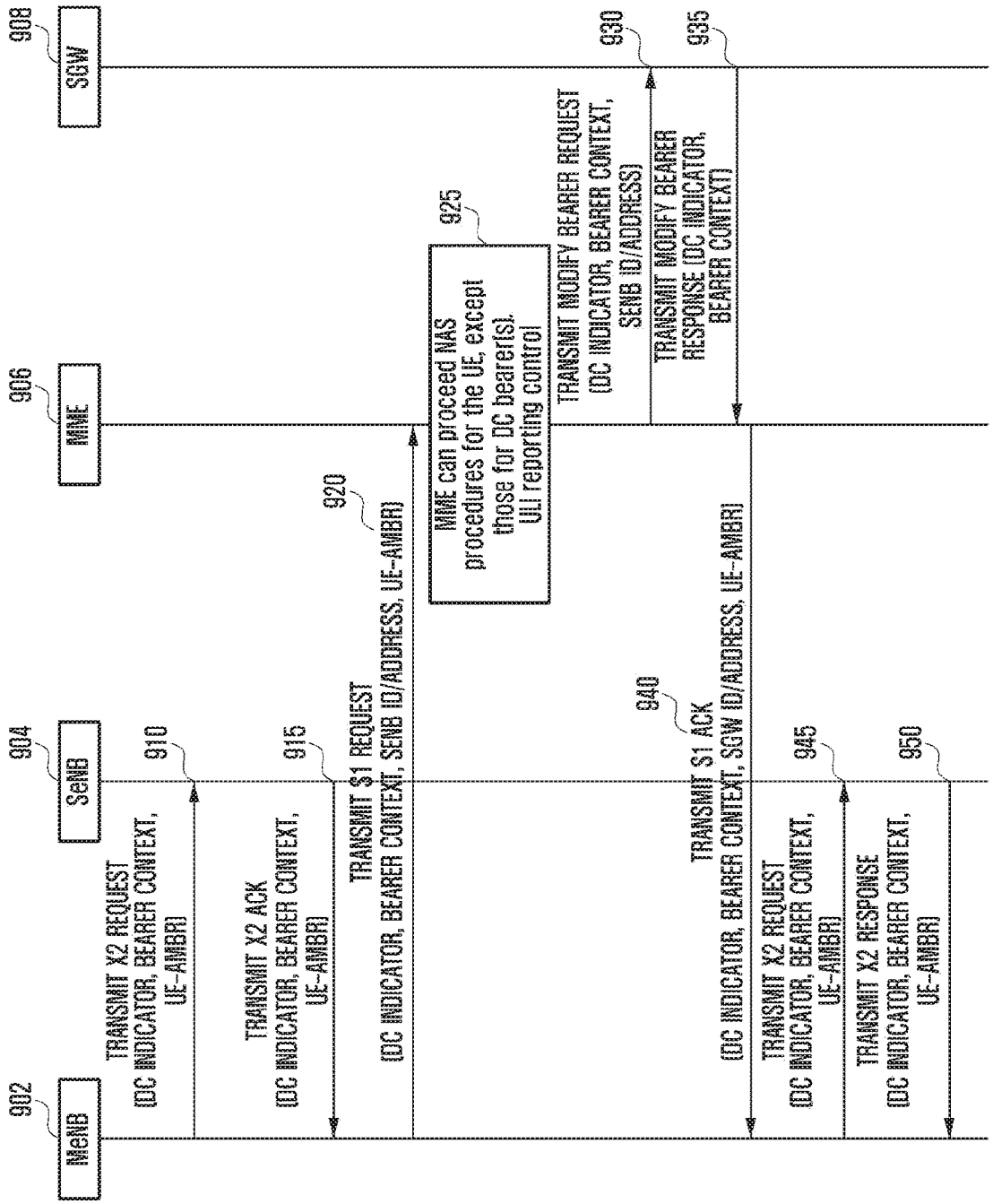
FIG. 9 is a diagram illustrating a method for exchanging information between respective network entities in case a dual connectivity state modification is needed according to an embodiment of the present disclosure.

FIG. 9 is a diagram illustrating a method for exchanging information between respective network entities in case a dual connectivity state modification is needed according to an embodiment of the present disclosure.

Referring to FIG. 9, a master ENB (MeNB) 902, a small ENB (SeNB), an MME (Mobility Management Entity) 902, and an SGW (Serving GateWay) 908 may transmit and receive signals to and from other entities. Specifically, this embodiment describes a case in which at least one of EPS bearers is transferred from a macro cell to a small cell.

At step 910, the MeNB 902 may transmit an X2 request message to the SeNB 904 so as to transfer an EPS bearer to the S3NB 904. Although the X2 request message may include a handover request message in an embodiment, any other message transmittable between ENBs may be also applied. The X2 request message may contain at least one of an identifier indicating an operation for the dual connectivity, an identifier indicating the type of operation (e.g., at least one of an operation of transferring an EPS bearer to the SeNB, an operation of modifying the context of an EPS bearer set to the SeNB, and an operation of removing the EPS bearer set to the SeNB and bringing again the EPS bearer to the MeNB), and a bearer context including an ID and QoS parameter of a target EPS bearer.

Also, depending on an embodiment, the X2 request message may contain UE-AMBR that the SeNB 904 has to apply for UE.

At step 915, the SeNB 904 that receives the X2 request message determines whether the SeNB can operate in response to the request sent by the MeNB 902, and then transmits, to the MeNB 902, a response message based on the result of determination.

In an embodiment, if the request transmitted at the step 910 is accepted, the SeNB 904 may perform the dual connectivity operation for UE by using parameter contained in the request message transmitted by the MeNB 902. Additionally, if the requested operation is associated with the dual connectivity, the SeNB 904 may not transmit directly the request message, for example, a path switch request, to the MME 906.

In an embodiment, if EPS bearer transference to the SeNB 904 is accepted, the MeNB 902 may send an S1 request message to the MME 906 at step 920. Although the S1 request message may include the path switch request message in an embodiment, any other message transmittable and receivable between the ENB and the MME 906 may be also applied. In an embodiment, through the S1 request message, a data transfer path and context of EPS bearer for UE may be updated at the MME 906.

In an embodiment, the SI request message may contain at least one of an identifier indicating an operation for the dual connectivity, an identifier indicating the type of operation (e.g., at least one of an operation of transferring an EPS bearer to the SeNB, an operation of modifying the context of an EPS bearer set to the SeNB, and an operation of removing the EPS bearer set to the SeNB and bringing again the EPS bearer to the MeNB), and a bearer context including an ID and QoS parameter of a target EPS bearer. Depending on an embodiment, the bearer context may be selectively contained. Additionally, depending on an embodiment, the S1 request message may contain at least one of an address or identifier of the SeNB 904 and GTP TEID (Tunnel Endpoint ID) to be notified to the SGW 908. Also, if the modification of the entire UE-AMBR is needed by a connection generation through the SeNB 904, the S1 request message may further contain UE-AMBR.

At step 925, in connection with the S1 request received for the dual connectivity, the MME 906 may meet a situation in which performing a NAS procedure is needed while performing the requested SI procedure.

If the newly occurring or requested NAS procedure is not related to a target EPS bearer of a procedure being already performed for the dual connectivity, or if processing the NAS procedures does not affect the procedure being already performed for the dual connectivity, the NAS procedure may be performed in parallel with the procedure for the dual connectivity without postponing the NAS procedures or regarding as a failure. If the NAS procedure occurring in a procedure for the dual connectivity is related to the target EPS bearer of the procedure for the dual connectivity, or if processing the NAS procedure can affect the procedure for the dual connectivity, the MME 906 may perform the NAS procedure after the procedure for the dual connectivity or alternatively may pause the NAS procedure or regard as a failure and then, after finishing the NAS procedure, start again the procedure for the dual connectivity. If the user plane path of EPS bearer should be modified in an embodiment, the MME 906 may transmit a GTP-C request message to the SGW 908 at step 930. Although the GTP-C request message may include a modify bearer request message in an embodiment, any other message transmittable and receivable between the MME 906 and the SGW 908 may be also applied.

At step 935, the SGW 908 transmits a response message for the message received at the step 930.

At step 940, the MME 906 may transmit a response message for the S1 request previously received from the MeNB 902. In an embodiment, the S1 response message may include a path switch request ack message, and any other message transmittable and receivable between the ENB and the MME 906 may be also applied. The S1 response message may contain at least one of an identifier indicating an operation for the dual connectivity, an identifier indicating the type of operation, and a bearer context having an ID and QoS parameter of the target EPS bearer. Depending on an embodiment, the S1 response message may selectively contain the bearer context information. Also, the S1 message may contain information associated with UE-AMBR authorized by the MME 906. In an embodiment, if the UE-AMBR authorized by the MME 906 is different from a value exchanged between the MeNB 902 and the SeNB 904, the MeNB 902 may perform again a procedure of delivering again information associated with modified UE-AMBR to the SeNB 904.

Meanwhile, if the MeNB 902 is requested to perform a procedure related to the NAS (e.g., dedicated bearer establishment/modification/release, location reporting control, or NAS message transmission, etc.) from the MME 906 while performing the procedure related to the dual connectivity, the MeNB 902 may determine whether an EPS bearer being a target of the requested NAS-related procedure or being affected is identical with an EPS bearer being a target of the dual connectivity procedure. If identical, the MeNB 902 may notify that the NAS-related procedure received from the MME 906 may not be performed, together with the dual connectivity operation or a cause for notifying the transference of EPS bearer to the small ENB. The MME 906 that receives this should try again the same NAS procedure after a procedure due to the dual connectivity is completed or fails. If not identical, the ENB may process the request of the MME 906 together with the dual connectivity operation.

Meanwhile, in an embodiment, if a handover (HO) occurs while the UE has connections with both the MeNB and the SeNB, data buffered for the UE in the MeNB may be delivered to a new handover MeNB and data buffered in the SeNB may be lost. Thus, in this case, there is a need to transfer data buffered in the SeNB to a new ENB at the occurrence of HO and then deliver it to the UE. Alternatively, if data buffered in the SeNB is lost during HO procedure, there is a need to prevent wrong charging by removing related charging information.

Figure 10:
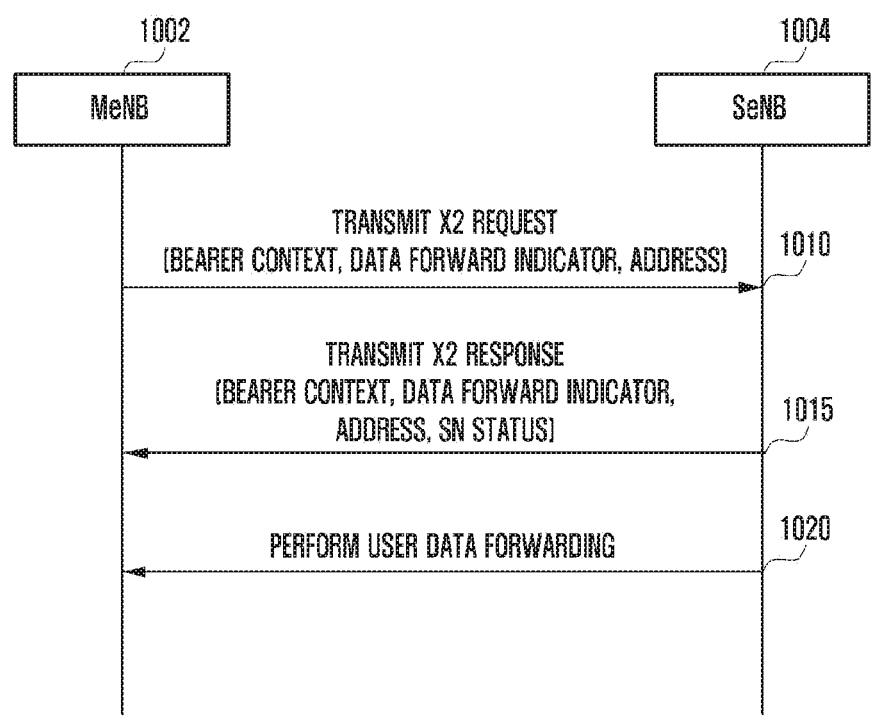
FIG. 10 is a diagram illustrating a procedure of signal transmission and reception between ENBs in a handover according to an embodiment of the present disclosure.

FIG. 10 is a diagram illustrating a procedure of signal transmission and reception between ENBs in a handover according to an embodiment of the present disclosure. Specifically, this shows an operation of releasing resources, i.e., EPS bearer, allocated to the SeNB by the MeNB for HO or any other reason.

Referring to FIG. 10, the MeBN 1002 and the SeNB 1004 may transmit and receive signals.

At step 1010, in case of having to release an EPS bearer for UE in the SeNB 1004, the MeNB 1002 may transmit an X2 request message to the SeNB 1004. Although the X2 request message may include a resource release request in an embodiment, any other message transmittable between ENBs may be also applied. In an embodiment, the X2 request message may contain at least one of a context including an identifier of a release target EPS bearer, an identifier requesting data forwarding, and an address for data transmission and reception.

At step 1015, the SeNB 1004 that receives the X2 request message may transmit an X2 response message to the MeNB 1002. The X2 response message may include a resource release response message in an embodiment, and any other message transmittable and receivable between ENBs may be also applied. In an embodiment, the X2 response message may contain at least one of an identifier indicating the availability of data forwarding, a context including an identifier of a target EPS bearer and an SN (Sequence Number) status, and an address for transmission. The identifier indicating the availability of data forwarding may be selectively contained only when the data forwarding is available.

At step 1020, the SeNB 1004 may transmit buffered data toward an address received from the MeNB 1002. In an embodiment, if the transmission of the final buffered data from the SeNB 1004 to the MeNB 1002 is completed, the SeNB 1004 may transmit an end marker to the MeNB 1002.

Figure 11:
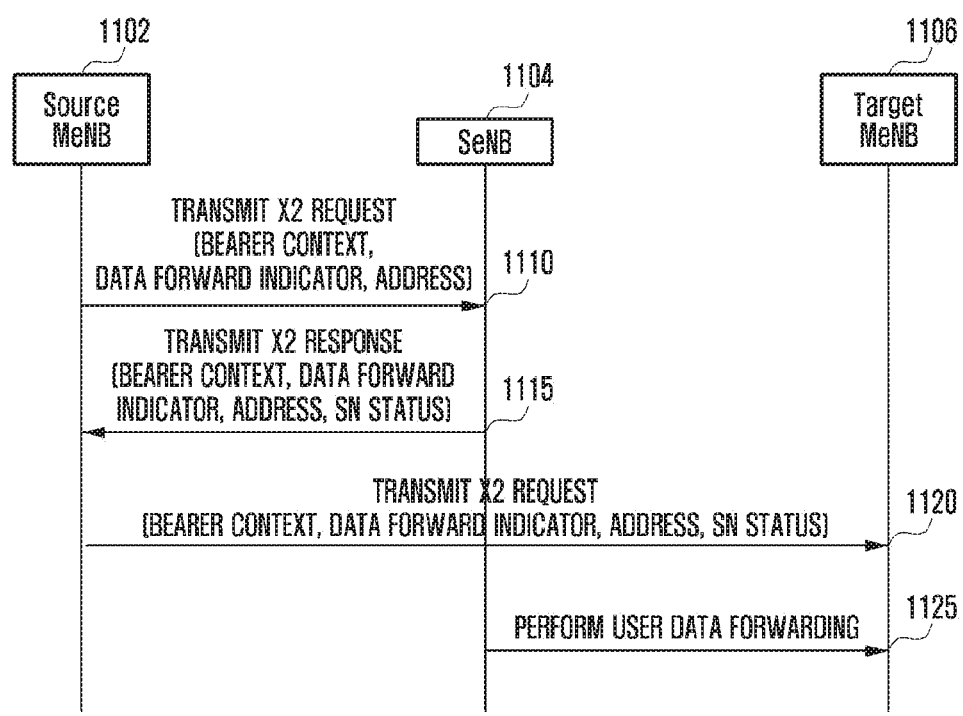
FIG. 11 is a diagram illustrating a procedure of signal transmission and reception between ENBs in a handover according to another embodiment of the present disclosure.

FIG. 11 is a diagram illustrating a procedure of signal transmission and reception between ENBs in a handover according to another embodiment of the present disclosure.

Referring FIG. 11, signals may be transmitted and received between a source MeNB 1102, a SeNB 1104, and a target MeNB 1106 on the assumption that HO is carried out from the source MeNB 1102 to the target MeNB 1106 while the source MeNB 1102 and the SeNB 1104 perform the dual connectivity with UE. Specifically, in this embodiment, if data forwarding occurs due to HO, and if the SeNB 1104 has a connection X2 with the target MeNB 1106 to be handed over, the SeNB 104 may deliver directly its own buffered data to the target MeNB 1106.

At step 1110, in case of having to release an EPS bearer for UE in the SeNB 1106, the source MeNB 1102 may transmit an X2 request message to the SeNB 1104. In an embodiment, the X2 request message may include a resource release request message, and any other message transmittable and receivable between ENBs may be also applied. The X2 message may contain at least one of a context including an identifier of a target EPS bearer, an identifier requesting data forwarding, and an identifier and address of a new MeNB (1106 in this embodiment) for data transmission and reception.

At step 1115, the SeNB 1104 that receives the X2 request message may determine, based on information contained in the received X2 message (e.g., an identifier and address of the target MeNB 1106), whether data forwarding to the target MeNB 1106 is possible. Then the SeNB 1104 may transmit an X2 response message to the source MeNB 1102. In an embodiment, the X2 response message may include a resource release response message, and any other message transmittable and receivable between ENBs may be also applied. In an embodiment, if buffered data forwarding is possible, the SeNB 1104 may transmit the X2 response message containing an identifier indicating the availability of data forwarding, a context including an identifier of a target EPS bearer and an SN (Sequence Number) status, and an address for transmission.

At step 1120, the source MeNB 1102 that receives the X2 response message may transmit, to the target MeNB 1106, an X2 message containing at least one of an identifier indicating a need of data forwarding, a context including an identifier of a target EPS bearer and an SN (Sequence Number) status, and an identifier and address of the SeNB 1104 for transmission.

At step 1125, the SeNB 1104 may transmit buffered data to the target MeNB 1106, based on an address of the target MeNB 1106 received from the source MeNB 1102. If the transmission of the final buffered data is completed, the SeNB 1104 may transmit an end marker to the target MeNB 1106.

Meanwhile, although the above embodiment describes the data forwarding performed through the X2 connection between the SeNB 1104 and the MeNB 1106, this embodiment may be similarly applied to data forwarding performed through the SGW instead of the X2 connection. Specifically, in an embodiment, the SeNB 1104 transmits buffered data to the SGW, which delivers the received data to the target MeNB 1102. Thus, the address for data forwarding to be exchanged between the SeNB 1104 and the source MeNB 1102 in the above embodiment may be changed to an address of the SGW. Additionally, the source MeNB 1102 may transmit additional information for identifying the SGW to the SeNB 1104.

Meanwhile, in case the SeNB fails to forward the buffered data to other ENB and thereby has to discard the data, charging may occur for discarded data.

Figure 12:
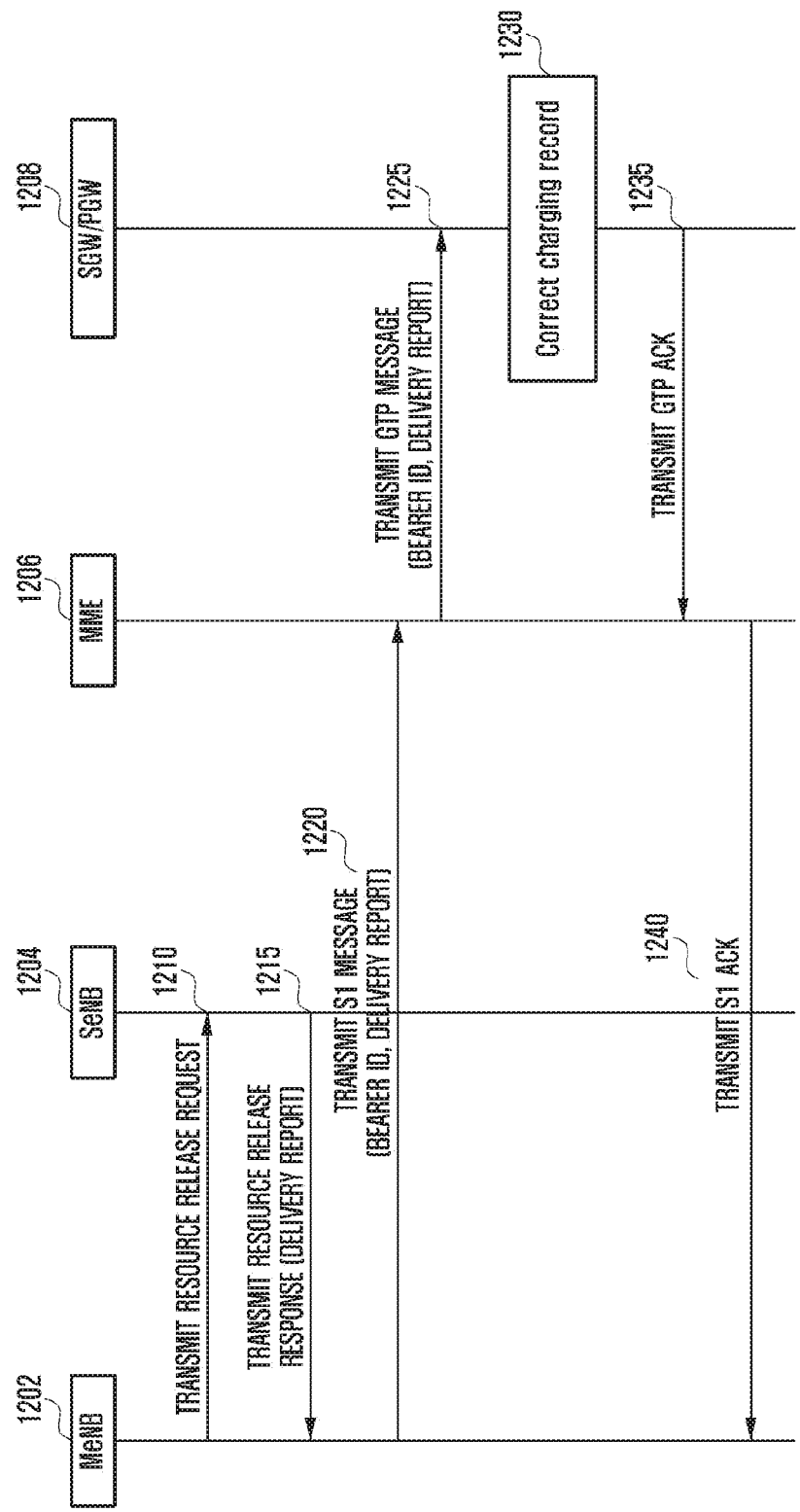
FIG. 12 is a diagram illustrating a signal transmission and reception procedure for modifying information associated with charging which occurs in a handover according to an embodiment of the present disclosure.

FIG. 12 is a diagram illustrating a signal transmission and reception procedure for modifying information associated with charging which occurs in a handover according to an embodiment of the present disclosure.

FIG. 12 shows a data transmission and reception procedure between a MeNB 1202, a SeNB 1204, a MME 1206, and a SGW/PGW 1208. Specifically, in case data of the SeNB is lost, related information is delivered to a node, such as SGW or PGW, for collecting charging data so as to solve a charging issue.

At step 1210, in case of having to release an EPS bearer for UE in the SeNB 1215 is released, the MeNB 1210 may transmit an X2 request message to the SeNB 1215. In an embodiment, the X2 request message includes a resource release request message, and any other message transmittable and receivable between ENBs may be also applied.

If the SeNB 1204 cannot forward buffered data in an embodiment, the SeNB 1204 may transmit, to the MeNB 1202, a delivery report indicating information about a data transmission success or failure. The delivery report may indicate a transmission success or failure of each data packet and contain bitmap-form information corresponding to each packet. Also, the delivery report may contain information such as the number of discarded packets or the total volume size.

At step 1220, the MeNB 120 that receives the delivery report may deliver a bearer identifier related to the received information to the MME 1106.

At step 1225, the MME 1206 may deliver the information received at the step 1220 up to the SGW and PGW 1208 by using a GTP message.

At step 1230, a charging data managing node, such as the SGW or PGW 1208, which receives data transmission status (bitmap indicating transmission success or failure of each data packet, the number of discarded packets, the total volume, etc.), may modify charging information.

At step 1235, the SGW/PGW 1208 may transmit a GTP ack message to the MME 1206. At step 1240, the MME 1206 may transmit an S1 ack message o the MeNB 1202.

Figure 13:
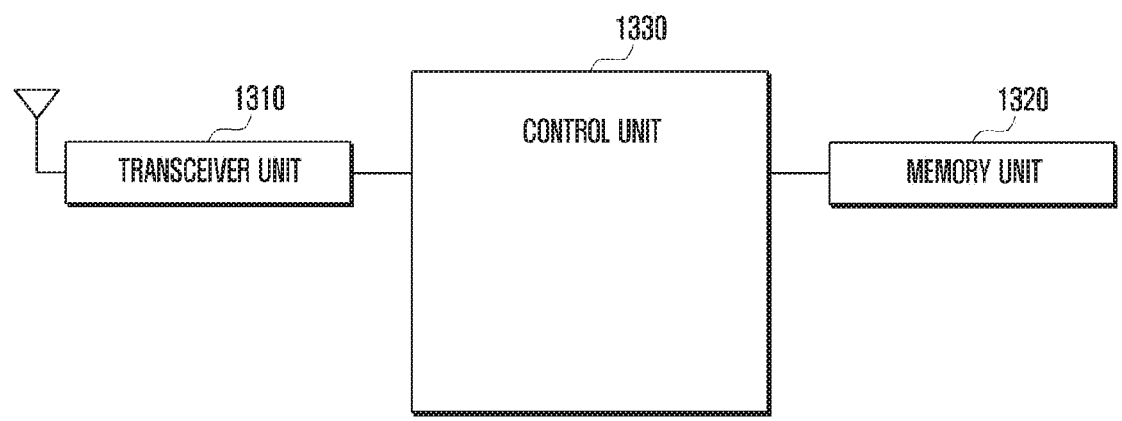
FIG. 13 is a block diagram illustrating an internal structure of user equipment according to an embodiment of the present disclosure.

FIG. 13 is a block diagram illustrating an internal structure of user equipment according to an embodiment of the present disclosure.

Referring to FIG. 13, the UE in an embodiment of this disclosure may include a transceiver unit 1310, a memory unit 1320, and a control unit 1330.

The transceiver unit 1310 may transmit and receive a signal to and from a RAN node in an embodiment. This signal may include a control signal, data, and the like.

The memory unit 1320 may store various programs required for the operation of the UE. Particularly, the memory unit 1320 according to an embodiment may store information associated with a message for access to the core network.

The control unit 1330 controls a signal flow between respective blocks for the operation of the UE. Specifically, the control unit 1330 may control the transceiver unit 1310 for access to the RAN.

Figure 14:
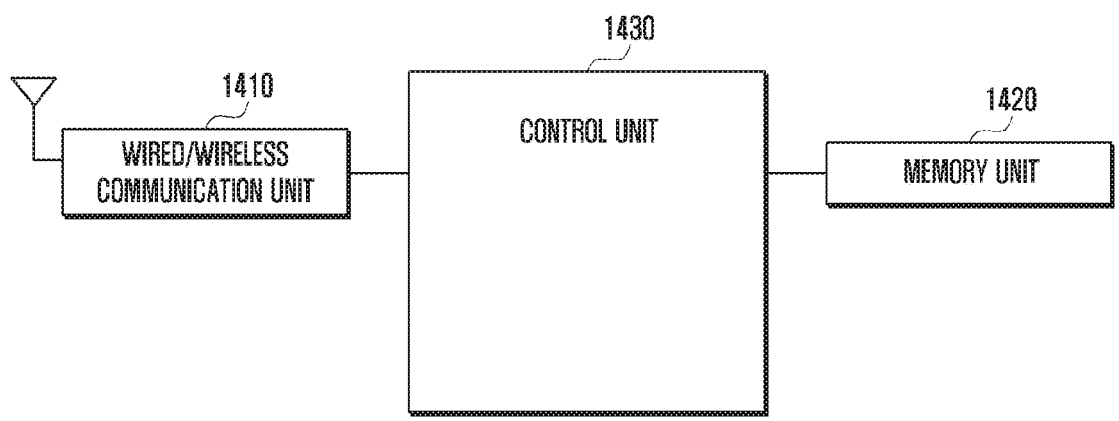
FIG. 14 is a block diagram illustrating an internal structure of an entity including a RAN according to an embodiment of the present disclosure.

FIG. 14 is a block diagram illustrating an internal structure of a network entity according to an embodiment of the present disclosure. Specifically, the network entity in an embodiment may include at least one of a RAN, an ePDG, a PGW, a PCRF, an HSS, an AAA, an SPR, a MeNB, a SeNB, an MME, and an SGW.

Referring to FIG. 22, the network entity in an embodiment of this disclosure may include a wired/wireless communication unit 1410, a memory unit 1420, and a control unit 1430.

The wired/wireless communication unit 1410 may include at least one of a wireless communication unit for performing communication with UE and a wired communication unit for performing communication with nodes of the core network.

The memory unit 1420 may store various programs required for the operation of the network entity. Also, information stored in the memory unit 1420 may include at least one of user subscription information and QoS information. Also, the memory unit 1420 may store charging information for data packet.

The control unit 1430 may control a signal flow between respective blocks for the operation of the network entity.

While the present invention has been particularly shown and described with reference to an exemplary embodiment thereof, it will be understood by those skilled in the art that various changes in form and details may be made therein without departing from the scope of the invention as defined by the appended claims.

The invention claimed is:

1. A method for a packet data network gateway (P-GW) in a communication system, the method comprising:
   receiving, from an evolved packet data gateway (ePDG), a message related to a binding corresponding to a terminal;
   transmitting, to a policy and charging rule function (PCRF), a credit control request (CCR) message based on the message related to the binding corresponding to the terminal;
   receiving, from the PCRF, a credit control answer (CCA) message in response to the CCR message;
   transmitting, to an authentication, authorization and accounting (AAA) server, a request message for updating an address of the P-GW;
   receiving, from the AAA server, a response message in response to the request message;
   identifying whether the CCA message includes first information on a default bearer quality of service (QoS) and second information on aggregate maximum bit rate (AMBR); and
   establishing a connection or a bearer related to the terminal based on the first information and the second information, in case that the CCA message includes the first information on the default bearer QoS and the second information on the AMBR,
   wherein the connection or the bearer related to the terminal is established based on third information on a default bearer QoS and fourth information on an AMBR included in the response message from the AAA server, in case that the CCA message does not include the first information and the second information.

2. The method of claim 1, wherein the message related to the binding comprises information on a network access identifier related to the terminal and information on an access point name corresponding to the terminal.

3. The method of claim 1, wherein the first information on the default bearer QoS is allocated by the PCRF.

4. The method of claim 1, wherein the first information comprises information on a QoS class identifier corresponding to the default bearer QoS.

5. A packet data network gateway (P-GW) in a communication system, the P-GW comprising:
   a transceiver configured to transmit and receive a signal; and
   at least one processor coupled with the transceiver and configured to:
      receive, from an evolved packet data gateway (ePDG), a message related to a binding corresponding to a terminal,
      transmit, to a policy and charging rule function (PCRF), a credit control request (CCR) message based on the message related to the binding corresponding to the terminal,
      receive, from the PCRF, a credit control answer (CCA) message in response to the CCR message,
      transmit, to an authentication, authorization and accounting (AAA) server, a request message for updating an address of the P-GW,
      receive, from the AAA server, a response message in response to the request message,
      identify whether the CCA message includes first information on a default bearer quality of service (QoS) and second information on aggregate maximum bit rate (AMBR), and
      establish a connection or a bearer related to the terminal based on the first information and the second information, in case that the CCA message includes the first information on the default bearer QoS and the second information on the AMBR,
   wherein the connection or the bearer related to the terminal is established based on third information on a default bearer QoS and fourth information on an AMBR included in the response message from the AAA server, in case that the CCA message does not include the first information and the second information.

6. The P-GW of claim 5, wherein the message related to the binding comprises information on a network access identifier related to the terminal and information on an access point name corresponding to the terminal.

7. The P-GW of claim 5, wherein the first information on the default bearer QoS is allocated by the PCRF.

8. The P-GW of claim 5, wherein the first information comprises information on a QoS class identifier corresponding to the default bearer QoS.

* * * * *